(12) United States Patent
Pepe

(10) Patent No.: US 8,365,631 B2
(45) Date of Patent: Feb. 5, 2013

(54) BRACKET FOR TRANSPORTING AND ASSEMBLING AN ACTUATION SYSTEM OF A MECHANICAL SERVO-ASSISTED GEARBOX

(75) Inventor: Giovanni Pepe, Grottaglie (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 987 days.

(21) Appl. No.: 12/283,466

(22) Filed: Sep. 12, 2008

(65) Prior Publication Data

US 2009/0084213 A1 Apr. 2, 2009

(30) Foreign Application Priority Data

Sep. 13, 2007 (EP) .................................. 07425564

(51) Int. Cl.
*B62D 65/00* (2006.01)
(52) U.S. Cl. .................. 74/473.11; 74/606 R; 248/300; 248/346.3
(58) Field of Classification Search ............... 74/473.11, 74/606 R; 137/884; 248/200, 300, 346.3; 477/130, 131
See application file for complete search history.

(56) References Cited

U.S. PATENT DOCUMENTS

| | | | | |
|---|---|---|---|---|
| 1,270,718 A | * | 6/1918 | Ford ................................ | 108/62 |
| 3,000,515 A | * | 9/1961 | Gifford ......................... | 211/153 |
| 5,611,372 A | * | 3/1997 | Bauer et al. .................... | 137/884 |
| 5,845,544 A | * | 12/1998 | Huggins et al. ............. | 74/606 R |
| 6,393,943 B1 | * | 5/2002 | Sommer et al. ............. | 74/606 R |
| 6,695,748 B2 | * | 2/2004 | Kopec et al. .................. | 477/130 |
| 2002/0032093 A1 | | 3/2002 | Kopec ........................... | 475/114 |

FOREIGN PATENT DOCUMENTS

| | | | |
|---|---|---|---|
| DE | 100 52 666 | * | 5/2002 |
| EP | 0 983 893 | | 3/2000 |
| EP | 1 452 778 | | 9/2004 |

OTHER PUBLICATIONS

Extended European Search Report dated Feb. 25, 2008 for corresponding European Patent Application No. 07425564.7.

* cited by examiner

*Primary Examiner* — William C Joyce
(74) *Attorney, Agent, or Firm* — Ohlandt, Greeley, Ruggiero & Perle, L.L.P.

(57) ABSTRACT

A bracket for transporting and assembling an actuation system of a servo-assisted mechanical gearbox, which actuation system presents a plurality of reciprocally connected assemblies; the bracket presents a first part adapted to support a first assembly of the actuation system and at least a second part, which is adapted to support a second assembly of the actuation system and is movable with respect to the first part.

18 Claims, 3 Drawing Sheets

BRACKET FOR TRANSPORTING AND ASSEMBLING AN ACTUATION SYSTEM OF A MECHANICAL SERVO-ASSISTED GEARBOX

The present invention relates to a bracket for transporting and assembling an actuation system of a servo-assisted mechanical gearbox.

BACKGROUND OF THE INVENTION

Servo-assisted mechanical transmissions, which are structurally similar to a manual mechanical transmission of the traditional type except for the clutch pedal and the gear selection lever operated by the driver being replaced by corresponding electric or hydraulic servo-controls, are increasingly widespread. By using a servo-assisted mechanical transmission, the driver simply needs to send the order to shift gear up or down to a transmission control unit, and the transmission control unit independently shifts gear by acting on both the engine and the servo-controls associated to clutch and gearbox.

A gear shifting order may be generated either manually, i.e. following a command imparted by the driver, or automatically, i.e. regardless of the driver's action. When the gear shifting order is generated, the transmission control unit drives the servo-control of the clutch to open the clutch so as to mechanically separate a primary shaft of the gearbox from a drive shaft; at the same time, the transmission control unit acts on the engine control unit to temporarily reduce the driving torque supplied by the engine itself.

Once the transmission control unit has verified the opening of the clutch, the transmission control unit drives the gearbox servo-control to disengage the currently engaged gear; when the transmission control unit has verified the gear disengagement, the transmission control unit drives the gearbox servo-control to displace the gearbox control shaft so as to arrange the engagement of the new gear. Once the transmission control unit has verified that the gearbox control shaft has reached the desired position, the transmission control unit drives the gearbox servo-control to engage the new gear.

Finally, when the transmission control unit has verified that the new gear has been engaged, the transmission control unit drives the clutch servo-control to close the clutch, so as to make the primary shaft of the gearbox and the drive shaft reciprocally and angularly integral; at the same time, the transmission control unit acts on the engine control unit to restore the driving torque supplied by the engine itself.

The clutch servo-control is generally of the hydraulic type and comprises a single hydraulic actuator for displacing the clutch from the closed position to the open position and vice versa. Generally, the gearbox servo-control is also of the hydraulic type and acts on a gearbox control shaft to impart to the control shaft itself both an axial displacement, i.e. along a central axis, to select the gear range, and a rotation about the central axis to engage and disengage each gear. Consequently, the gearbox servo-control comprises a first hydraulic actuator mechanically coupled to the control shaft to axially displace the control shaft and a second hydraulic actuator mechanically coupled to the control shaft to rotate the control shaft.

The actuation system of the servo-assisted mechanical gearbox generally consists of four assemblies (control fluid reservoir, electric pump for pressurizing the control fluid, solenoid valve assembly, hydraulic actuator assembly) which are reciprocally connected and thus filled with the control fluid by the actuation system manufacturer. Once the actuation system has been completed (i.e. once the assemblies of the actuation system have been reciprocally connected and filled with the control fluid), the manufacturer of the actuation system sends the actuation system itself to the mechanical gearbox manufacturer who mounts the actuation system in the mechanical gearbox.

Currently, during the transportation of the actuation system, the assemblies of the actuation system themselves are fixed to a rigid transportation bracket (which may be disposable or returnable) having a flat shape to optimize the volumes. The transportation bracket is used also when assembling the actuation system in the mechanical gearbox; specifically, assembling the actuation system in the mechanical gearbox contemplates fixing the solenoid valve assembly to the mechanical gearbox in its definitive position leaving the solenoid valve assembly mounted on the transportation bracket. Subsequently, the transportation bracket must be removed because its presence prevents the access to some parts of the mechanical gearbox where the reservoir is fixed; being the reservoir connected in a non-detachable manner to the solenoid valve assembly, the reservoir must be disassembled before being able to remove the transportation bracket. However, such operation is complicated and requires the intervention of at least two operators: one operator to hold the reservoir after it has been disassembled from the transportation bracket, and another operator to remove the transportation bracket and to mount the parts of the mechanical gearbox where the reservoir is fixed. In other words, when assembling the actuation system in the mechanical gearbox, the transportation bracket hinders the freedom of movement of the operator and must therefore be removed during an initial step of mounting; however, the removal of the transportation bracket in an initial step of assembling makes the handling of the actuation system assemblies complicated (particularly that of the reservoir) and thus the intervention of two operators is required, at least for a certain time, with an evident increase of cycle times and assembling costs.

SUMMARY OF THE INVENTION

It is the object of the present invention to provide a bracket for transporting and assembling an actuation system of a servo-assisted mechanical gearbox, which bracket being free from the above-described drawbacks and, specifically, being easy and cost-effective to manufacture, being small-sized and facilitating the actuation system mounting.

According to the present invention, there is provided a bracket for transporting and assembling an actuation system of a servo-assisted mechanical gearbox as claimed in the attached claims.

BRIEF DESCRIPTION OF THE DRAWINGS

The present invention will now be described with reference to the accompanying drawings, which illustrate a non-limitative embodiment thereof, in which.

DETAILED DESCRIPTION OF THE INVENTION

Figure 1:
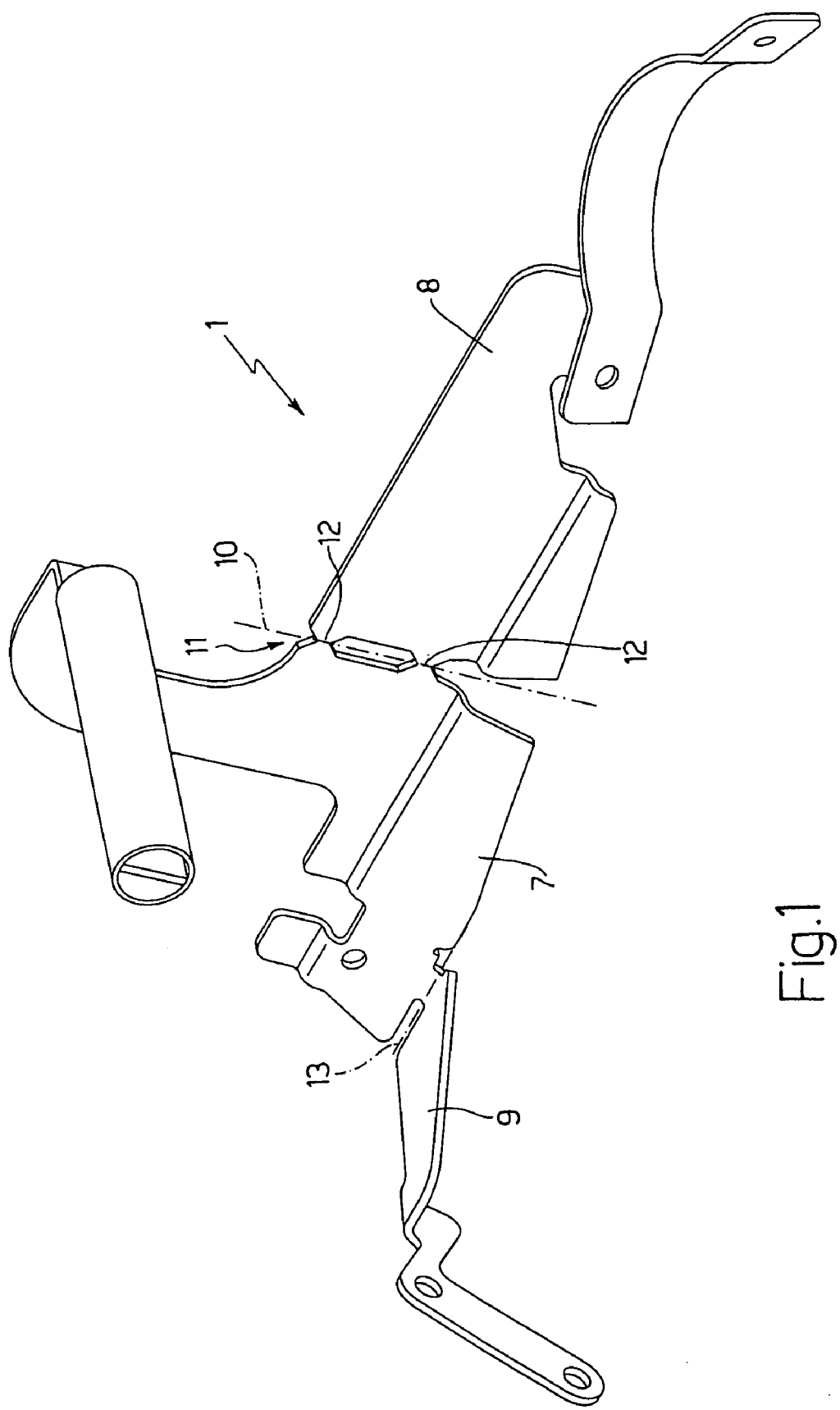
FIG. 1 is a perspective view of a bracket for transporting and assembling an actuation system of a servo-assisted mechanical gearbox according to the present invention.

In FIG. 1, number 1 indicates as a whole a bracket for transporting and assembling an actuation system 2 (shown in FIGS. 2 and 3) of a servo-assisted mechanical gearbox.

Figure 2:
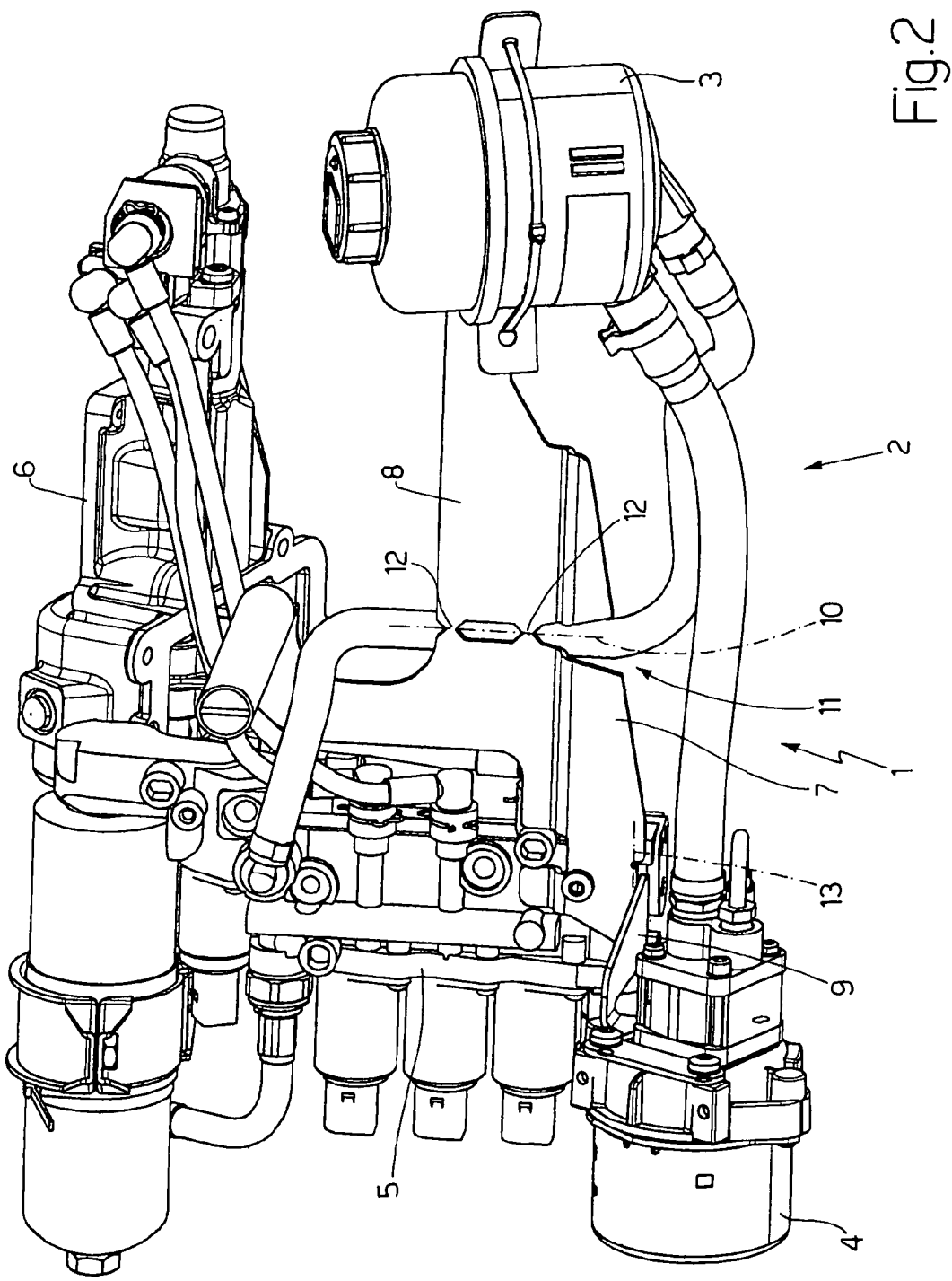
FIGS. 2 and 3 are two different perspective views of the bracket in FIG. 1 supporting an actuation system of a servo-assisted mechanical gearbox.
Figure 3:
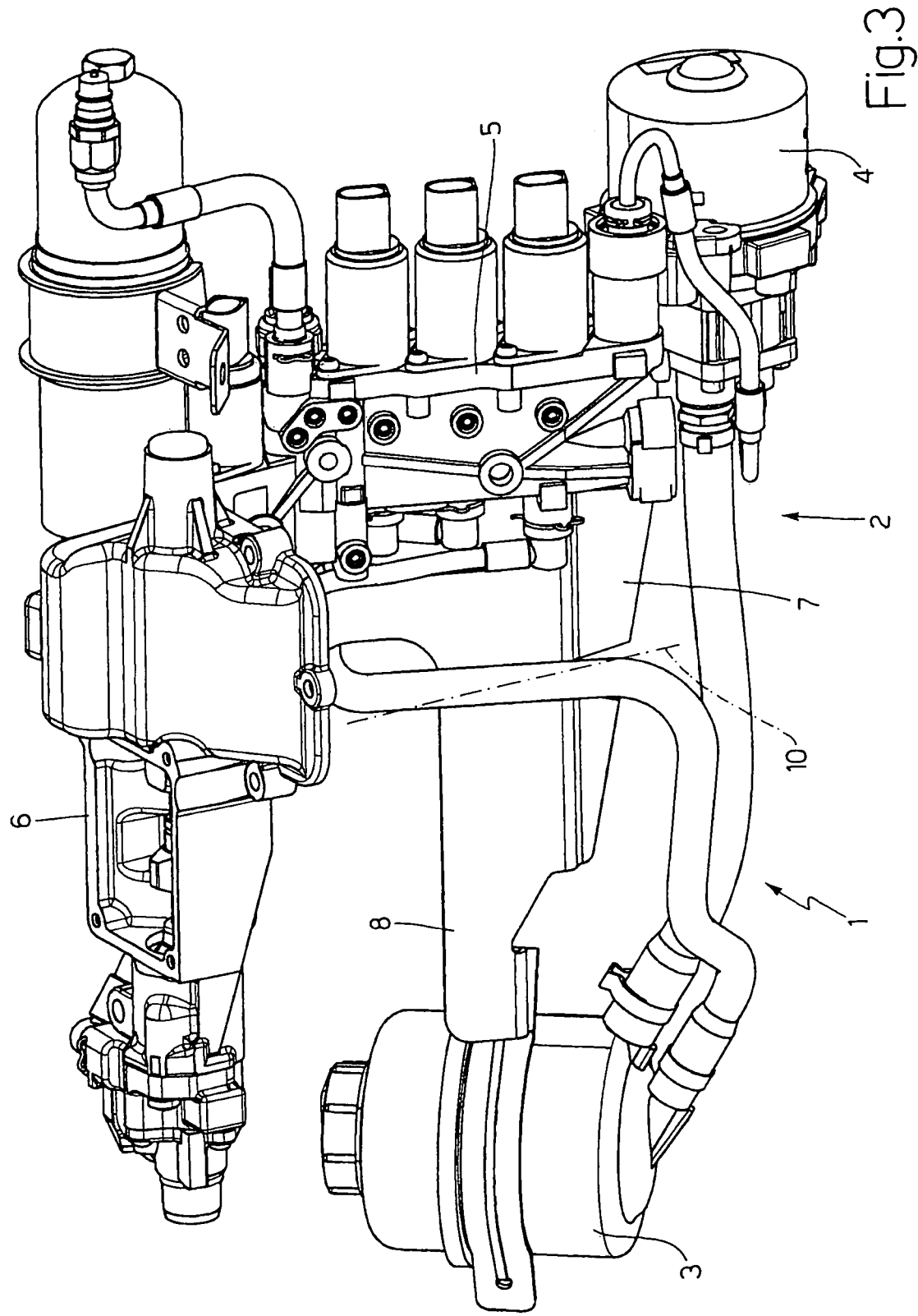

As shown in FIGS. 2 and 3, the actuation system 2 of a servo-assisted mechanical gearbox generally comprises four assemblies: a reservoir 3 adapted to contain a control fluid, an electric pump 4, which pressurizes the fluid drawn from the reservoir 3, a solenoid valve assembly 5, and a hydraulic actuator assembly 6. The assemblies 3-6 are reciprocally and hydraulically connected by means of corresponding flexible pipes and are thus fixed to the bracket 1 to be transported from the manufacturer of the actuation system 2 to the manufacturer of the servo-assisted gearbox.

As shown in FIG. 1, the bracket 1 is formed by metal material (e.g. steel) and comprises a central part 7 and two end parts 8 and 9. Alternatively, the transportation bracket 1 may be either returnable (i.e. it is returned to the manufacturer of the actuation system 2) or disposable (i.e. it is eliminated by the manufacturer of the actuation system 2).

The part 7 of the bracket 1 is adapted to support the solenoid valve assembly 5 of the actuation system 2 and the part 8 is adapted to support the reservoir 3 of the actuation system 2. The part 8 of the transportation bracket 1 is movable with respect to the part 7 of the bracket 1 and, specifically, the part 8 may be displaced with respect to the part 7 by means of a rotation about a rotation axis 10.

According to a preferred embodiment shown in the accompanying figures, the bracket 1 is disposable and comprises an intermediate deformable zone 11, which is arranged between the part 7 and the part 8 to allow the rotation of the part 8 with respect to the part 7. Preferably, the deformable intermediate zone 11 presents weakening notches 12 along the rotation axis 10. The part 8 rotates about the rotation axis 10 by approximately 90° with respect to the part 7, moving between a transportation position (shown in the accompanying figures), in which the two parts 7 and 8 are reciprocally coplanar to reduce the volume, and a mounting position (not shown), in which the part 8 is approximately perpendicular to the part 7 to assist in mounting the actuation system 2.

According to a further embodiment (not shown), the rigid transportation bracket 1 is returnable and thus comprises a hinge arranged between the part 7 and the part 8 to allow the movement of the part 8 with respect to the part 7; in this manner, the rotation of the part 8 with respect to the part 7 may be repeated many times without damages. In order to allow the rotation of the part 8 with respect to the part 7 to take place only during the step of assembling the actuation system 2 and not during transportation, the hinge is provided with locking means, which are activatable to prevent the rotation between the part 7 and the part 8.

The part 9 of the bracket 1 is adapted to support the electric pump 4 and is also preferably movable with respect to the part 7 of the bracket 1; specifically, the part 9 may be displaced with respect to the part 7 by means of a rotation about a rotation axis 13. The rotation of the part 9 with respect to the part 7 allows to displace the part 9 from a small-sized transportation position to a mounting position, which facilitates mounting the actuation system 2.

As shown in FIGS. 2 and 3, the part 7 of the bracket 1 is adapted to support the hydraulic actuator assembly 6.

In use, when mounting the actuation system 2 in the mechanical gearbox, the solenoid valve assembly 5 is fixed to the mechanical gearbox in its definitive position leaving the solenoid valve assembly 5 mounted onto the transportation bracket 1. Thereafter, the part 8 of the transportation bracket 1 is displaced by means of rotation about the rotation axis 10, so as to fix the parts of the mechanical gearbox where the reservoir 3 is then fixed; subsequently, the reservoir 3 is disassembled from the bracket 1 and fixed to the mechanical gearbox. At this point, the electric pump 4 is disassembled from the part 9 of the bracket 1 and the part 9 of the transportation bracket 1 is displaced by means of rotation about the rotation axis 13, so as to allow an easier fixing of the electric pump 4 to the mechanical gearbox. Finally, the hydraulic actuator assembly 6 is disassembled from the transportation bracket 1 and is fixed to the mechanical gearbox; at this point, the solenoid valve assembly 5 is also removed from the bracket 1, which is thus removed.

It is important to note that the displacement of the part 8 of the bracket 1 and thus of the reservoir 3 in an initial step of mounting simplifies the handling of the assemblies of the actuation system 2; in this manner, the intervention of one only operator who is able to perform all the operations at ease is required for assembling.

The above-described bracket 1 and the mounting of an actuation system 2 of a servo-assisted mechanical gearbox presents several advantages, because it is simple, economical, small-sized and above all allows access to all mechanical gearbox assemblies making easier mounting the actuation system 2 of the servo-assisted mechanical gearbox.

The invention claimed is:

1. An actuation system to be combined with a servo-assisted mechanical gearbox, the actuating system comprising:
   a plurality of reciprocally connected assemblies;
   a bracket, the bracket comprising:
   a first part adapted to support a first assembly of the actuation system; and
   at least a second part adapted to support a second assembly of the actuation system,
   the second part being movable with respect to the first part,
   wherein the second part rotates with respect to the first part about a first rotation axis by an angle of approximately 90° between a transportation position in which the first part is coplanar with the second part and a mounting position in which the first part is perpendicular to the second part.

2. An actuation system according to claim 1, wherein the second part rotates with respect to the first part about a first rotation axis.

3. An actuation system according to claim 1, further comprising a third part, which is adapted to support a third assembly of the actuation system and is movable with respect to the first part.

4. An actuation system according to claim 3, wherein the third part rotates with respect to the first part about a second axis of rotation between a transportation position and a mounting position.

5. An actuation system according to claim 1, wherein the first part is adapted to also support a fourth assembly of the actuation system.

6. An actuation system according to claim 1, wherein the first assembly of the actuation system is a solenoid valve assembly and the second assembly of the actuation system is a control fluid reservoir, and further comprising a third assembly of the actuation system that is an electric pump for pressurizing the control fluid and a fourth assembly of the actuation system that is a hydraulic actuator assembly.

7. An actuation system to be combined with a servo-assisted mechanical gearbox, the actuating system comprising:
   a plurality of reciprocally connected assemblies;
   a bracket, the bracket comprising:
   a first part adapted to support a first assembly of the actuation system;
   at least a second part adapted to support a second assembly of the actuation system, the second part being movable with respect to the first part;

an intermediate deformable zone, which is arranged between the first part and the second part to allow the movement of the first part with respect to the second part; and wherein the intermediate deformable zone allows the bracket to be configured from a transporting configuration to a mounting configuration; and 8. An actuation system according to claim 7, wherein the intermediate deformable zone presents weakening notches.

9. An actuation system to claim 7, further comprising a third part, which is adapted to support a third assembly of the actuation system and is movable with respect to the first part.

10. An actuation system according to claim 9, wherein the third part rotates with respect to the first part about a second axis of rotation between a transportation position and a mounting position.

11. An actuation system according to claim 7, wherein the first part is adapted to also support a fourth assembly of the actuation system.

12. An actuation system according to claim 7, wherein the first assembly of the actuation system is a solenoid valve assembly and the second assembly of the actuation system is a control fluid reservoir, and further comprising a third assembly of the actuation system that is an electric pump for pressurizing the control fluid and a fourth assembly of the actuation system that is a hydraulic actuator assembly.

13. An actuation system to be combined with a servo-assisted mechanical gearbox, the actuating system comprising:
a plurality of reciprocally connected assemblies;
a bracket, the bracket comprising:
a first part adapted to support a first assembly of the actuation system;
at least a second part adapted to support a second assembly of the actuation system, the second part being movable with respect to the first part; and
a hinge interposed between the first part and the second part.

14. An actuation system according to claim 13, wherein the hinge is provided with locking means activatable to prevent rotation between the first part and the second part.

15. An actuation system according to claim 13, further comprising a third part, which is adapted to support a third assembly of the actuation system and is movable with respect to the first part.

16. An actuation system according to claim 15, wherein the third part rotates with respect to the first part about a second axis of rotation between a transportation position and a mounting position.

17. An actuation system according to claim 13, wherein the first part is adapted to also support a fourth assembly of the actuation system.

18. An actuation system according to claim 13, wherein the first assembly of the actuation system is a solenoid valve assembly and the second assembly of the actuation system is a control fluid reservoir, and further comprising a third assembly of the actuation system that is an electric pump for pressurizing the control fluid and a fourth assembly of the actuation system that is a hydraulic actuator assembly.

* * * * *